United States Patent
Duncan (10) Patent No.: US 10,980,188 B2
(45) Date of Patent: Apr. 20, 2021

(54) VERTICAL PLANTER BOX

(71) Applicant: William Stuart Duncan, Georgetown, SC (US)

(72) Inventor: William Stuart Duncan, Georgetown, SC (US)

( * ) Notice: Subject to any disclaimer, the term of this patent is extended or adjusted under 35 U.S.C. 154(b) by 337 days.

(21) Appl. No.: 16/052,950

(22) Filed: Aug. 2, 2018

(65) Prior Publication Data
US 2019/0037778 A1  Feb. 7, 2019

Related U.S. Application Data

(60) Provisional application No. 62/541,143, filed on Aug. 4, 2017.

(51) Int. Cl.
*A01G 9/02* (2018.01)
*A01G 27/02* (2006.01)
*A01G 9/24* (2006.01)

(52) U.S. Cl.
CPC ............ *A01G 9/023* (2013.01); *A01G 9/025* (2013.01); *A01G 9/247* (2013.01); *A01G 27/02* (2013.01)

(58) Field of Classification Search
CPC ........ A01G 9/023; A01G 9/025; A01G 9/247; A01G 27/02; A01G 9/02; A01G 9/021; A01G 9/022; A01G 9/12; A01G 17/04; A01G 17/06
See application file for complete search history.

(56) References Cited

U.S. PATENT DOCUMENTS

| | | | | |
|---|---|---|---|---|
| 2,763,096 A | * | 9/1956 | Roger | A01G 9/12 47/45 |
| 4,610,106 A | * | 9/1986 | Robinson | A01G 9/12 47/45 |
| 5,315,783 A | * | 5/1994 | Peng | A01G 27/00 47/31.1 |
| 5,373,662 A | * | 12/1994 | Wickstrom | A01G 9/022 47/65.9 |
| 5,524,382 A | * | 6/1996 | Rubin | A01G 9/12 47/44 |
| 5,647,695 A | * | 7/1997 | Hilfiker | E01F 8/025 405/258.1 |
| 7,926,224 B1 | | 4/2011 | Koumoudis | |

(Continued)

FOREIGN PATENT DOCUMENTS

| | | | | |
|---|---|---|---|---|
| EP | 3127422 A1 | * | 2/2017 | A01G 9/025 |
| FR | 3053568 A1 | * | 1/2018 | H02S 20/25 |

(Continued)

OTHER PUBLICATIONS

JP 01196231 A machine translation (Year: 1989).*
JP 2002272277 A machine translation (Year: 2002).*

*Primary Examiner* — Son T Nguyen
(74) *Attorney, Agent, or Firm* — Carlson, Gaskey & Olds, P.C.

(57) ABSTRACT

A disclosed vertical planter box assembly includes perimeter walls defining an interior space for holding plants. The perimeter wall includes openings aligned around the interior space. A water basin is provided at a top side for communicating water into the interior space. A drip tray is supported below a bottom side for capturing draining water from the interior space. A plurality of pins extend through the openings and across the interior space to hold the plant structures in place within the interior space.

10 Claims, 10 Drawing Sheets

(56) References Cited

U.S. PATENT DOCUMENTS

| | | |
|---|---|---|
| 8,495,833 B2 | 7/2013 | Cussol et al. |
| 8,646,205 B2 | 2/2014 | Cho |
| 2006/0242901 A1* | 11/2006 | Casimaty ............... A01G 9/033 47/65.9 |
| 2007/0125024 A1* | 6/2007 | Ponzo ................... E04F 19/00 52/364 |
| 2007/0199241 A1* | 8/2007 | Peleszezak ............ E01F 8/027 47/65.9 |
| 2008/0120904 A1* | 5/2008 | Takahashi ............. A47F 7/0078 47/65.8 |
| 2008/0302009 A1 | 12/2008 | Frecon et al. |
| 2010/0313473 A1* | 12/2010 | Cussol .................. A01G 9/022 47/65.7 |
| 2011/0148124 A1* | 6/2011 | Soejima ................ A01G 9/022 290/1 R |
| 2013/0025199 A1 | 1/2013 | Perroulaz et al. |
| 2013/0180172 A1* | 7/2013 | Silverberg ............ A01G 9/022 47/65 |
| 2015/0013223 A1* | 1/2015 | Rajagopalan ......... A01G 9/025 47/71 |
| 2018/0295792 A1* | 10/2018 | Atwood ................ A01G 9/20 |

FOREIGN PATENT DOCUMENTS

| | | | | |
|---|---|---|---|---|
| GB | 2503911 A | * | 1/2014 | ............ A01G 9/022 |
| GB | 2527150 A | * | 12/2015 | ............ A01G 9/12 |
| JP | 01196231 A | * | 8/1989 | ............ A01G 9/022 |
| JP | 2002272277 A | * | 9/2002 | |
| JP | 2005224199 A | * | 8/2005 | |
| WO | WO-2011016777 A1 | * | 2/2011 | ............ A01G 9/025 |

\* cited by examiner

VERTICAL PLANTER BOX

CROSS REFERENCE TO RELATED APPLICATION

This application claims priority to U.S. Provisional Application No. 62/541,143, which was filed Aug. 4, 2017.

TECHNICAL FIELD

This disclosure generally relates to a vertical planter for use in creating a wall or easel mounted display for ornamental plants.

BACKGROUND

One method of displaying succulent plants is to support them within a box that can be mounted to a wall or stood up in a vertical configuration on a horizontal surface. Currently, a box is placed on a horizontal surface, filled in with potting soil and then covered with a wide mesh screen. Cuttings from plants are inserted through the screen and into the potting soil. Only after the cuttings have matured and rooted sufficiently within the wire mesh is the box ready for vertical display. Rooting and maturation of the plants can take weeks or months. Most consumers do not have weeks or months to devote to a single project and would enjoy a more time efficient method and system for creating a vertical planter display.

SUMMARY

An example vertical planter box assembly embodiment includes, among other possible things, a perimeter wall portion disposed around an interior space. The perimeter wall portion includes a plurality of openings aligned about the interior space. A water basin is provided at a top side of the perimeter wall portion. The water basin includes openings for communicating water into the interior space. A drip tray is supported below a bottom side and at least one drain opening is disposed in the perimeter wall for draining water from the interior space into the drip tray. A plurality of pins extend through openings to hold the plant structures in place within the interior space.

Although the different examples have the specific components shown in the illustrations, embodiments of this disclosure are not limited to those particular combinations. It is possible to use some of the components or features from one of the examples in combination with features or components from another one of the examples.

BRIEF DESCRIPTION OF THE DRAWINGS

The various features and advantages provided in this disclosure will become apparent to those skilled in the art from the following detailed description of the currently preferred embodiment. The drawings that accompany the detailed description are described below.

DETAILED DESCRIPTION

Figures 1, 2:
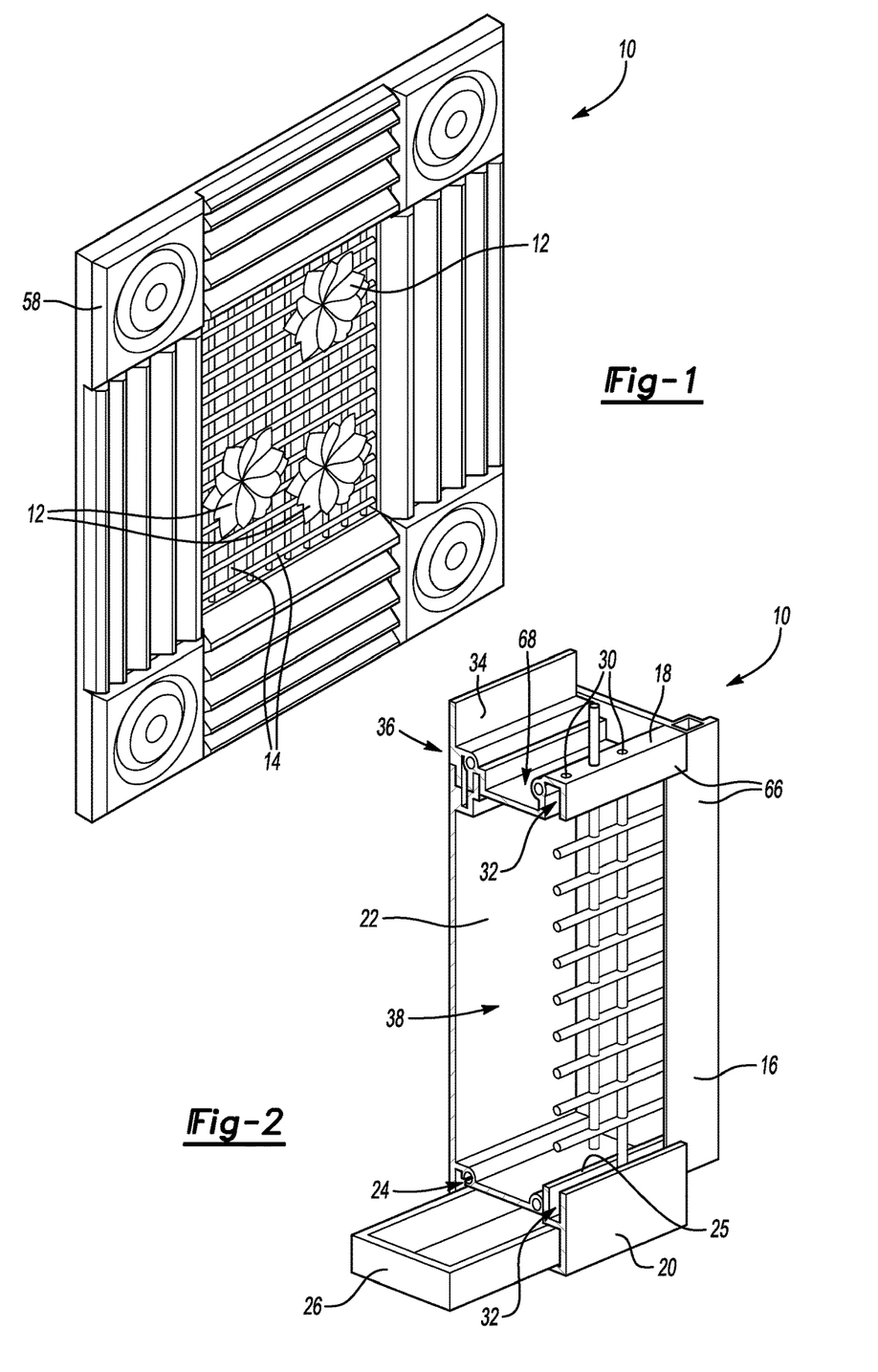
FIG. 1 is a schematic representation of an example vertical planter box for mature plants.
FIG. 2 is a sectional view of an example vertical planter box.

Referring to FIG. 1, an example disclosed vertical planter box 10 includes a frame and a plurality of supports 14 that hold plants 12 within the box 10 so that the box 10 may be mounted on vertically on a wall. In this example, the plants 12 include a plurality of succulent plants that include many different variations of leaves, plants structures, colors and stems that provide an aesthetically desirable, decorative wall hanging that is created by a user.

It should be appreciated that although succulent plants are described by way of example throughout this disclosure that other plant types can be used with the example disclosed vertical planter boxes and are within the contemplation of this disclosure.

Figure 3:
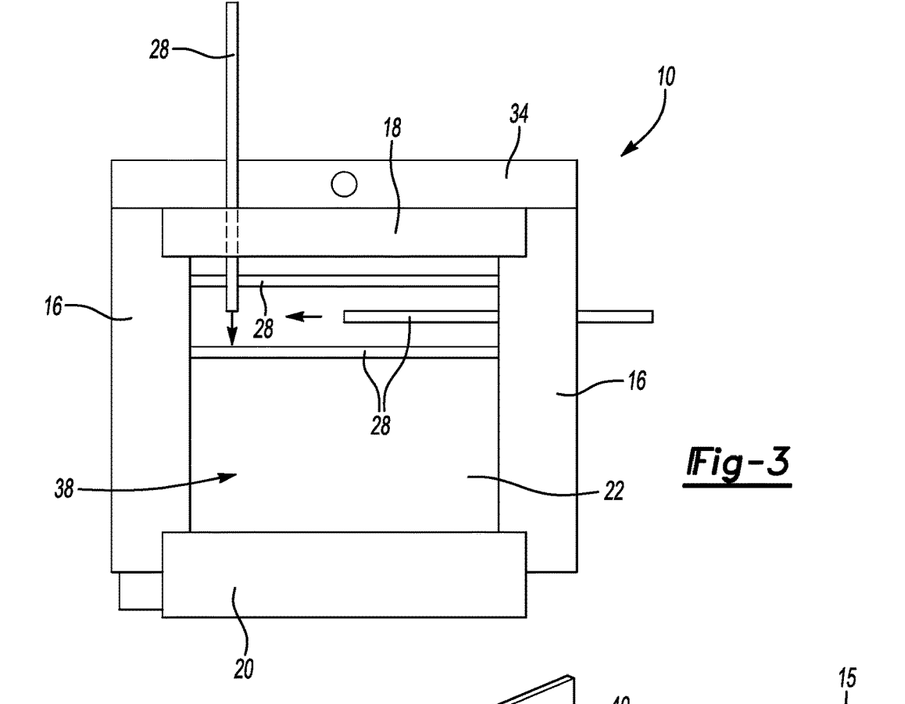
FIG. 3 is a front view of the example vertical planter box.

Referring to FIGS. 2 and 3 with continued reference to FIG. 1, the example vertical planter box 10 is constructed from plastic panels that include a side panel 16, a top panel 18, a bottom panel 20 and a back panel 22. The sides 16, top 18, bottom and back panel 22 define an interior cavity 38 for soil and plants. The sides 16, top 18 and bottom 20 are configured to include mounting flange 66 that accept and provide attachment for a decorative wood frame 58 (FIG. 1) or other aesthetically preferred frame.

The vertical planter box 10 includes pins 28 that form a grid support system across the interior cavity 38. The pins 28 are interwoven across the interior cavity 38 to support the succulent plants 12 when the planter box 10 is hung on the wall in a vertical orientation. The support system enables the planter box 10 to be hung without waiting for plants to root and grow through a fixed grid structure. The disclosed support system is installed after the plants are orientated within the interior cavity 38, thereby eliminating the need to wait an excessive amount of time for the plants to grow and root. The pins 28 can be installed over the plants or through the root structures to hold the plants in place.

Accordingly, each of the example planter boxes 10 includes a support system configured to enable installation of ready grown succulent plants into the cavity 38 defined by the sides, top and bottom in a manner that enables substantially immediate hanging on a vertical surface.

The top portion 18 includes a plurality of openings 30 through which pins 28 are inserted. The openings 30 are spaced apart across the top 18 at distances that provide a selection of spacing depending on the location and orientations of plants. In one example, the openings 30 are spaced ½ inch apart, however the openings 30 could be spaced apart different distances. The pins 28 are of a length that correspond with the length and width of the planter box 10. It should be appreciated that the example planter box 10 can be provided of any length and width and the pins 28 that are utilized would correspond with that length and width.

The pins 28 provide support for the succulent plants and extend through the openings 30 downward through a corresponding and aligned opening 30 provided in the bottom 20. In this example, the bottom 20 includes a bottom channel 32 into which the pins 28 are received. A plurality of openings are provided in one of the sides 16 for pins 28. The pins 28 extend across the cavity 38 and into aligned openings 30 or a channel like that shown on the bottom 20. The pins 28 extend around and through plants within the interior of the box 10 to support the mature plants. The pins 28 extending vertically from top to bottom and may be interwoven with pins 28 extending side to side to create a stable support framework around the plants.

Although a plurality of pins 28 are provided across the top and along the sides of the vertical planter box, a pin 28 is not needed for each opening. As appreciated, the pins 28 are inserted through openings 30 that correspond with a desired spacing of succulent plants. It should be understood that because each of the succulent plants has a different shape and size, that a simple, uniform grid pattern may not accommodate all different sizes and shapes of succulent plants desired to be installed into the vertical planter box 10. Accordingly, the example vertical planter box 10 and pins 28 can be installed within any combination of the openings 30 to accommodate different sizes and orientations of succulent plants within the cavity 38. The support structure created by interweaving the pins 28 is tailored to each grouping of plants to enable a user to create many different combinations, limited only by ones creativity.

The example box 10 includes the bottom part 20 that defines a channel 24 and openings 25 that enable moisture to flow into a drip tray 26 supported within the channel 24. The drip tray 26 provides a container from which water draining from the plants is held within the planter box 10 can drain. The top 18 can include a basin 68 to receive water and disperse that water into the plants disposed within the cavity 38. As appreciated, the plants require some moisture and that moisture is captured in the drip tray 26 that can be removed from the channel 24 and emptied as required. The drip tray 26 and basin 68 provides for watering the plants within the box 10 in the vertical orientation rather than require the box to be removed and placed in a horizontal position for watering.

Figure 4:
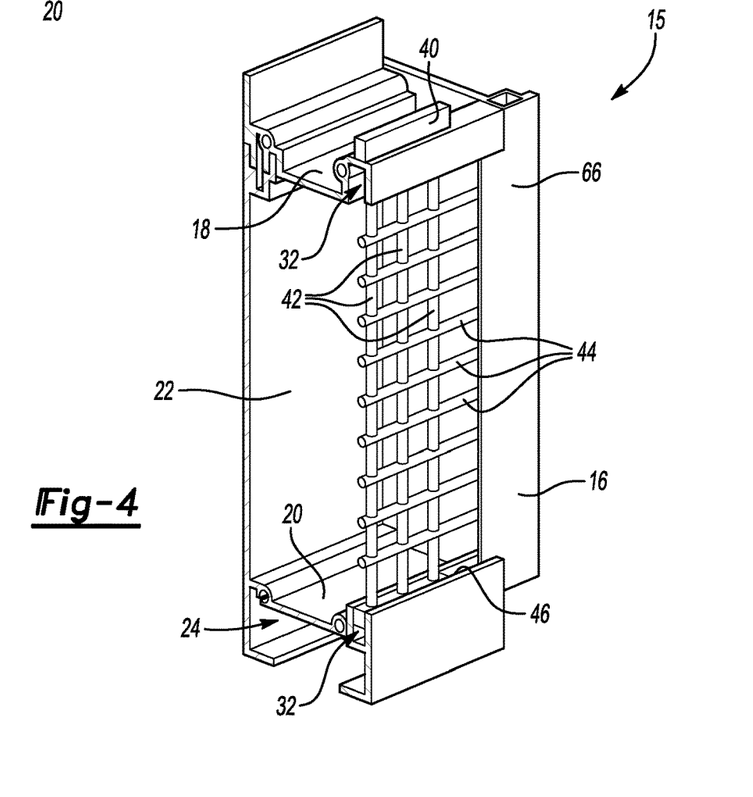
FIG. 4 is a sectional view of vertical planter box including another example support system embodiment.

Referring to FIG. 4, another example vertical planter box 15 is shown and includes support pins 44 attached to a common head portion 40. This orientation of the support pins 44 includes a comb like orientation where several pins are attached to a common head 40 such that more than one pin 44 can be inserted through the succulent plants at the same time.

The example vertical planter box 15 illustrated in FIG. 4 also includes a bottom channel 32 that receives an end of each of the pins 44 and secures those pins 44 in a retaining media schematically shown at 46. The retaining media 46 can be a pliable material that accepts the pins 44 and provides some resistance to removal of those pins. Moreover, because the pins 44 are inserted in a top down direction, the support pins 44 are maintained in position without the need for a significant retention force. However, the grid structure provided by the support pins 44 provides sufficient strength and durability along with sufficient stiffness to support the succulent plants within the vertical planter box 15 when hung in a vertical orientation.

Figures 5, 6:
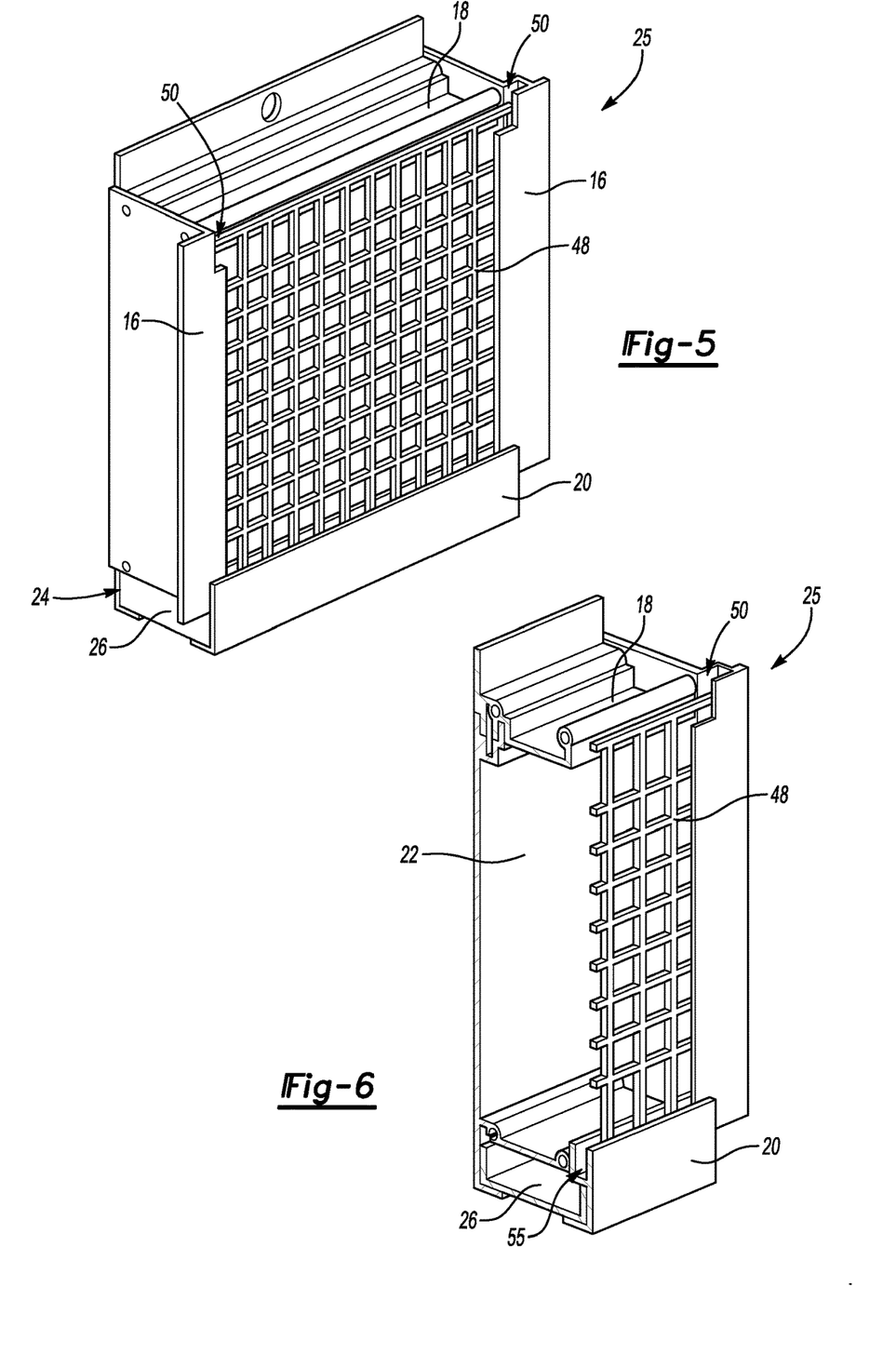
FIG. 5 is a perspective view of a vertical planter box including another example support system embodiment.
FIG. 6 is a sectional view of the vertical planter box and support system embodiment shown in FIG. 5.

Referring to FIGS. 5 and 6, another example vertical planter box embodiment 25 is shown with another example support structure. In this example, a one piece grid structure 48 is utilized and inserted within slots 50 defined in sides 16. The example vertical box 25 includes the drip tray 26 and a bottom channel 24 that receives a drip tray 26. Moreover, the bottom 20 includes a slot 55 that corresponds with the slots 50 in the sides 16 to receive and support the one piece grid 48 within the vertical planter box 10.

The one piece grid structure 48 is provided and supported within the slots 50, 55 to provide an alternate orientation that may be applicable to some plant structures and orientations. In some configurations and desired groupings of plants, a one piece grid structure 48 may be desirable and provide advantages over building of a custom support structure. Accordingly, the example vertical box 10 can be utilized with such a one piece structure as is shown in FIGS. 5 and 6.

Figure 7:
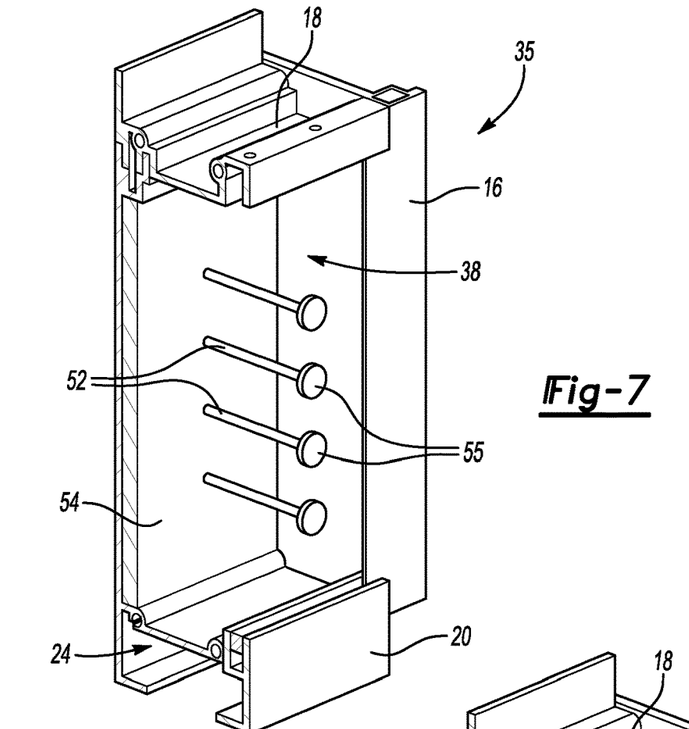
FIG. 7 is a sectional view of the vertical planter box with another example support system embodiment.

Referring to FIG. 7, another vertical planter box 35 is illustrated that includes a retaining media 54 disposed on the back panel 22 of the box 10. The retaining media 54 is provided to retain pins 52 having a crown portion 55 that is utilized to maintain and hold the succulent plants within the interior cavity 38. In this example embodiment, the pins 52 are inserted into or through succulent plant root structures to maintain the succulent plants within the cavity 38. The pins themselves 52 are supported and retained within the retaining media 54 and the crown portions 55 push against the plants to hold them in place. The retaining media 54 is a pliable substance such as cork, rubber or other material that can be pierced by the pins 52 and maintained sufficient resistance to hold the succulent plants in place.

Figure 8:
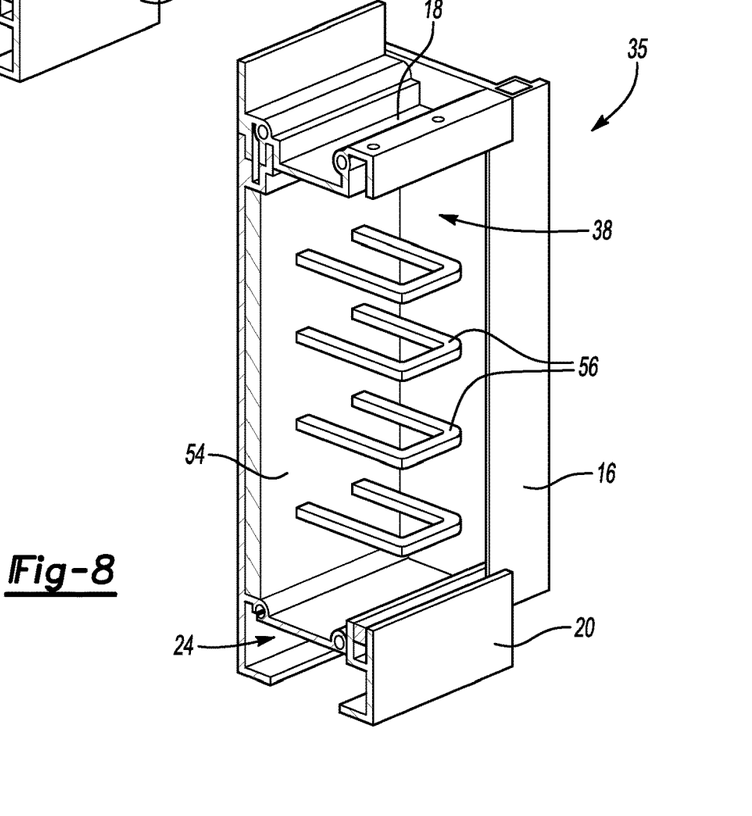
FIG. 8 is a sectional view of a vertical planter box including another example plant support system embodiment.

Referring to FIG. 8, another support structure is shown that includes a plurality of U-shaped support members 56 that are inserted and retained within the retaining material 54 supported on the back panel 22. The U-shaped pins 56 can surround portions of the succulent plants 12 inserted within the cavity 38 of the planter box 10. The U-shaped support members 56 enable securement of each individual plant to further provide options for tailoring creation and placement of the plant display.

Figure 9:
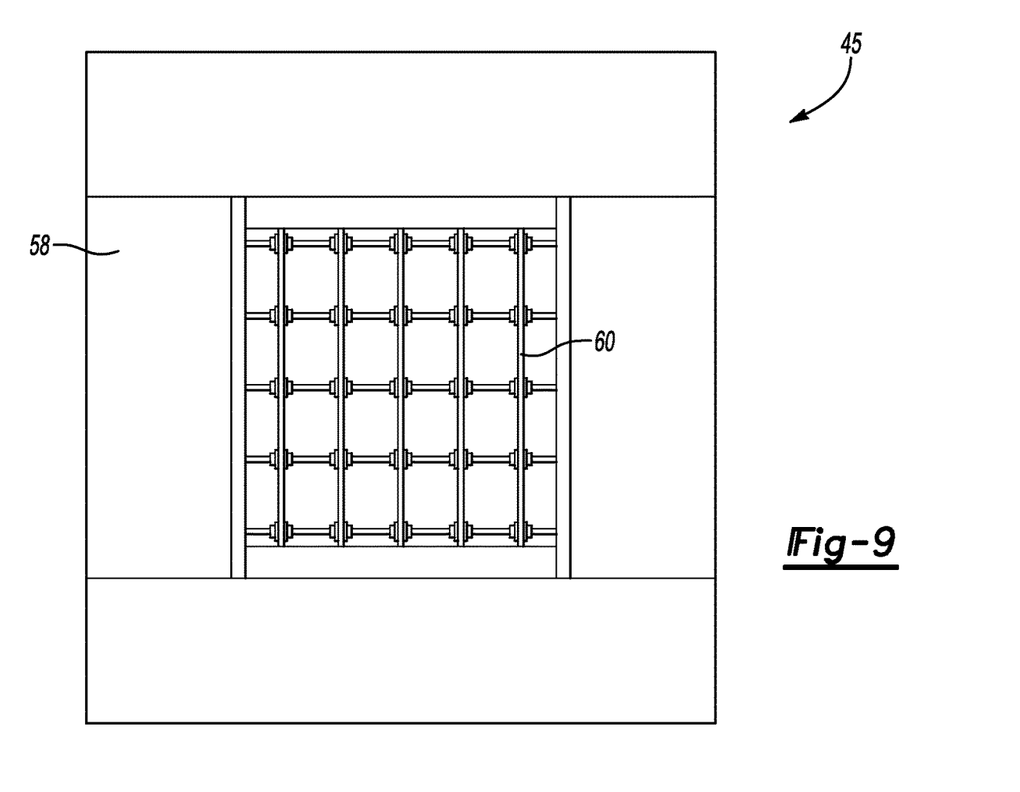
FIG. 9 is a front view of another vertical planter box including an example grid mounting system.
Figure 10:
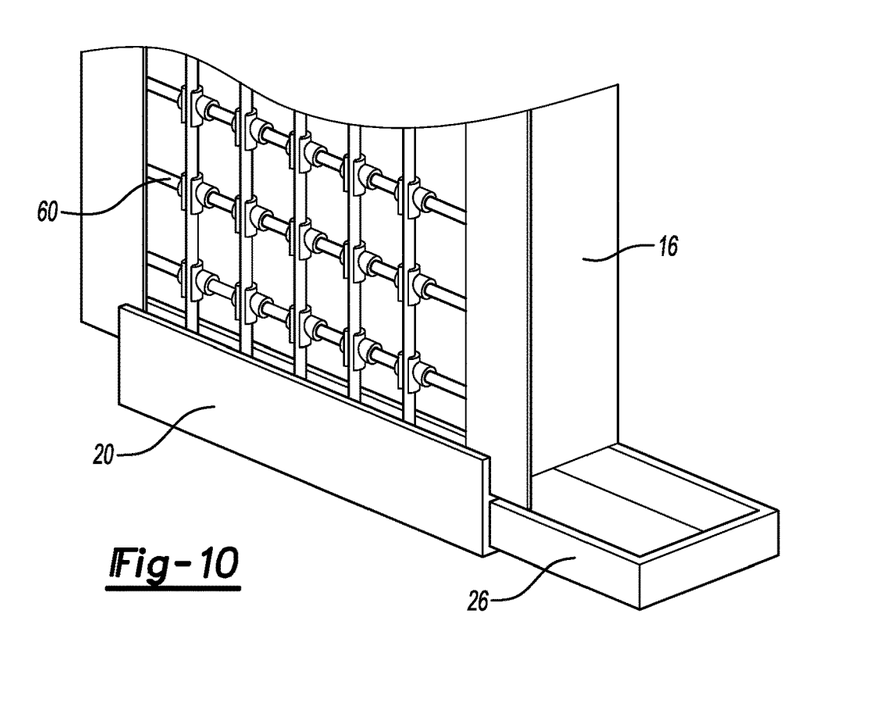
FIG. 10 is a perspective view of the vertical planter box including a drip drawer.
Figure 11:
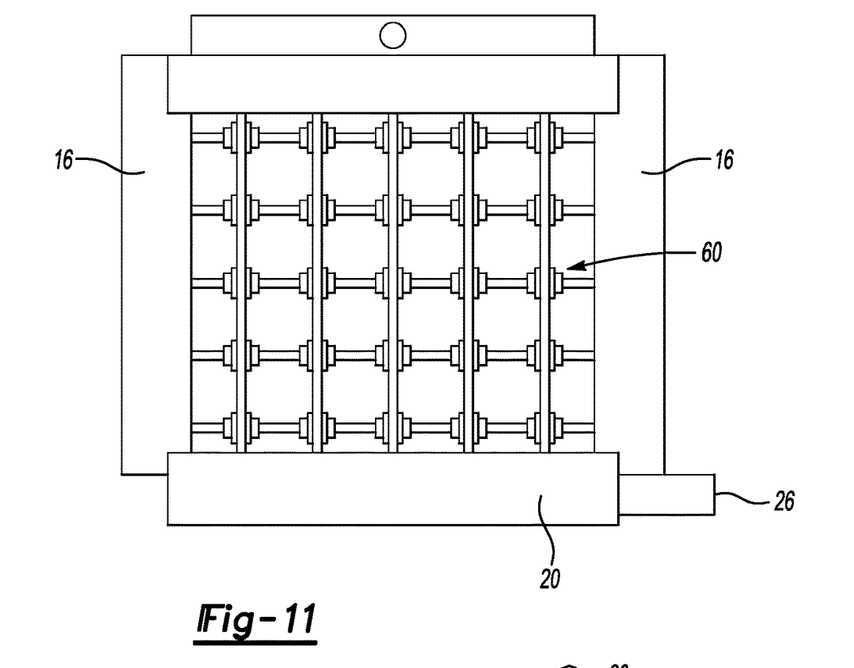
FIG. 11 is a front view of a vertical planter box separated from the example frame shown in FIG. 9.

Referring to FIGS. 9, 10 and 11, another example planter box embodiment 45 is shown and includes outer frame 58. In this example, the outer frame 58 is made of a wood to provide a desired aesthetic appearance. The disclosed vertical planter box 10 includes a grid structure 60 that is created from a plurality of connectors 62 attached to pins 64.

Figure 12:
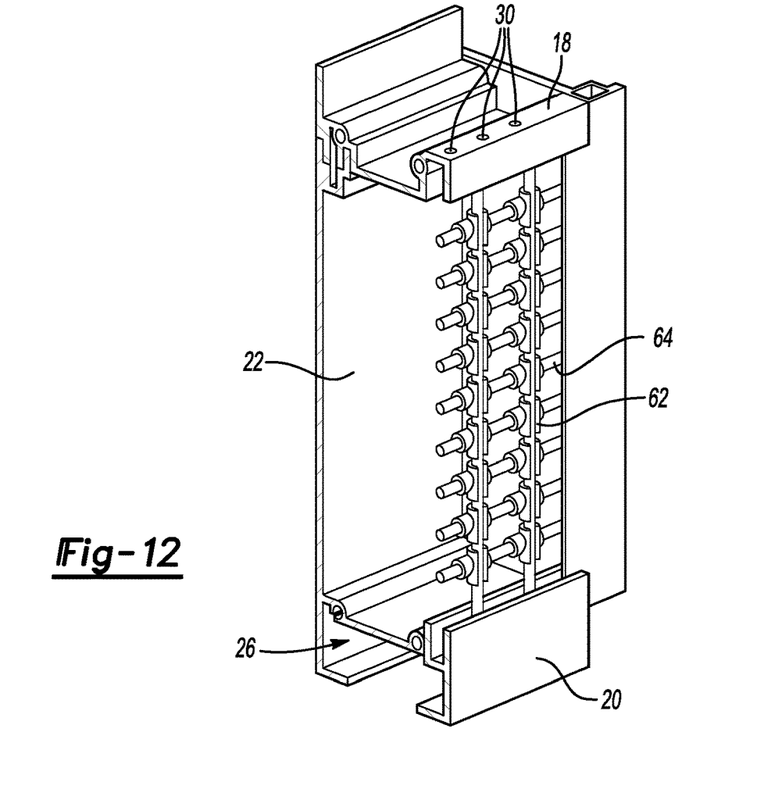
FIG. 12 is a sectional view of the vertical planter box and grid support system.
Figure 13:
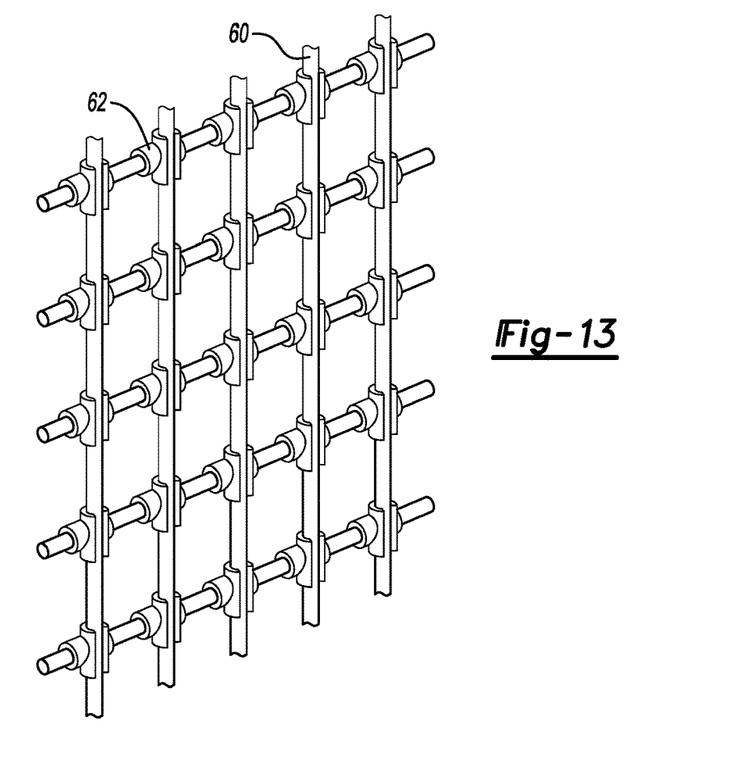
FIG. 13 is an enlarged view of the example grid system.
Figure 14:
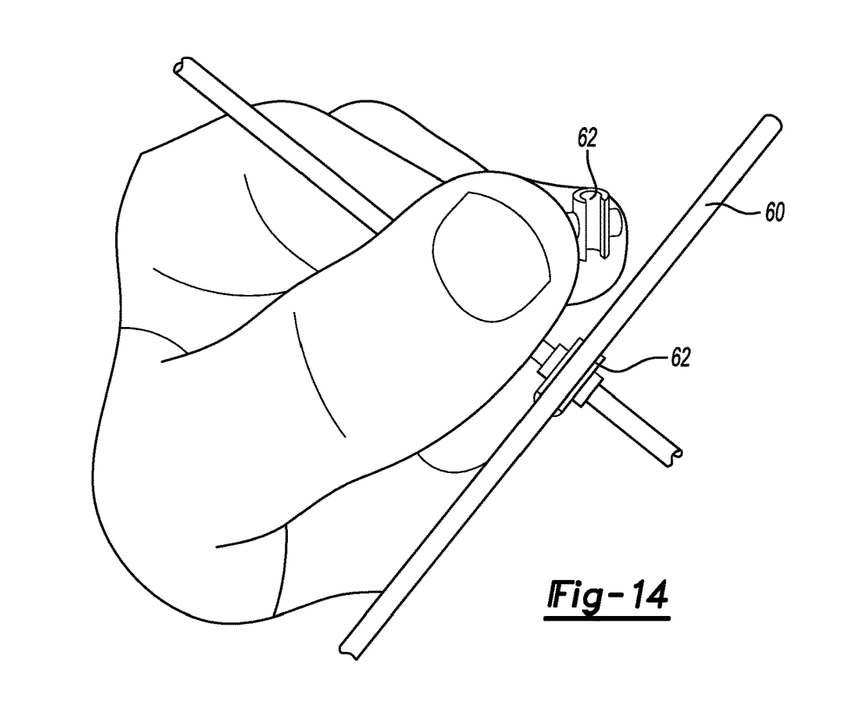
FIG. 14 is a perspective view of parts of the example grid system.

Referring to FIGS. 12, 13 and 14 with continued reference to FIGS. 9-11, the example grid structure 60 includes a connector 62 that include portions that trap and generate an interference fit around each pin 64. Each of the connectors 62 including portions for receiving pins 64 that are transverse to each other to provide a generally cross-shape. The cross-shape provides for one connector 62 to secure two pins 64 in a crossing transverse orientation. Each of the portions are identical and provide an interference fit against a corresponding pin 64. Accordingly, the connectors 62 and pins 64 enable creation of the grid over mature plants assembled within the interior cavity.

Figures 15, 16:
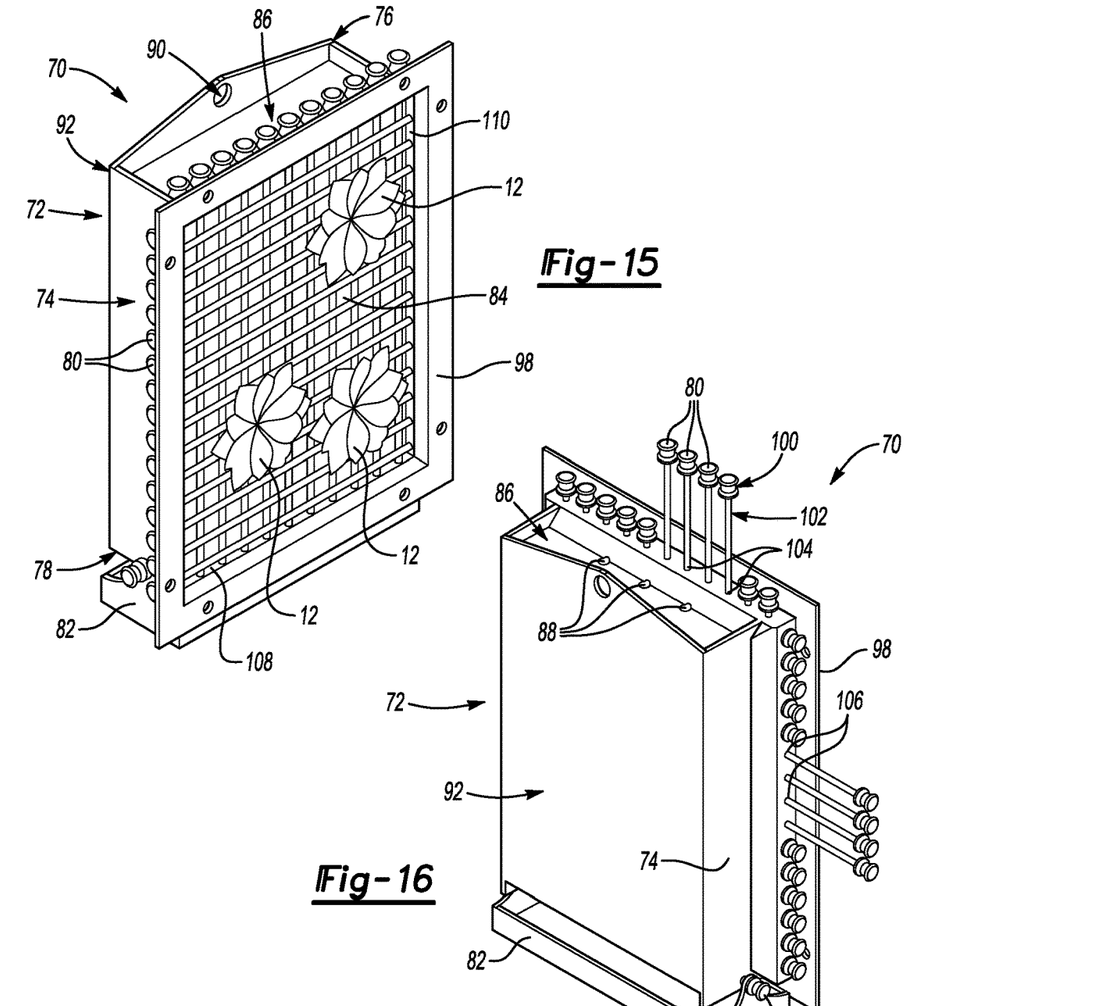
FIG. 15 is a perspective view of another example vertical planter box assembly embodiment.
FIG. 16 is a perspective view of a back of the vertical planter box assembly.
Figure 17:
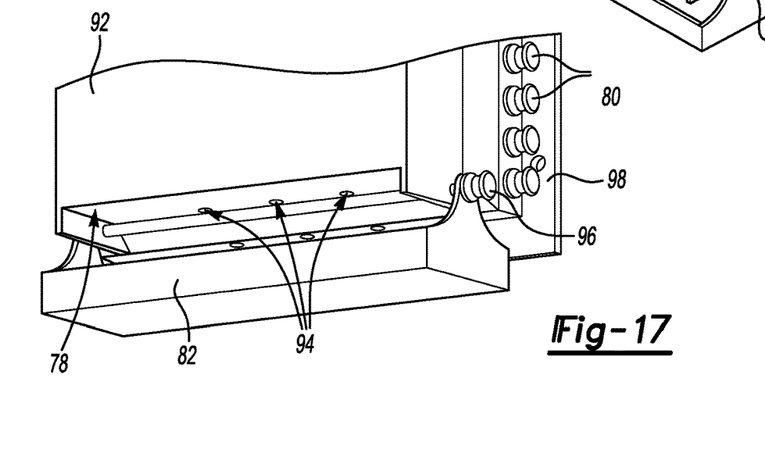
FIG. 17 is a perspective view of an example drip tray of the vertical planter box assembly.
Figure 18:
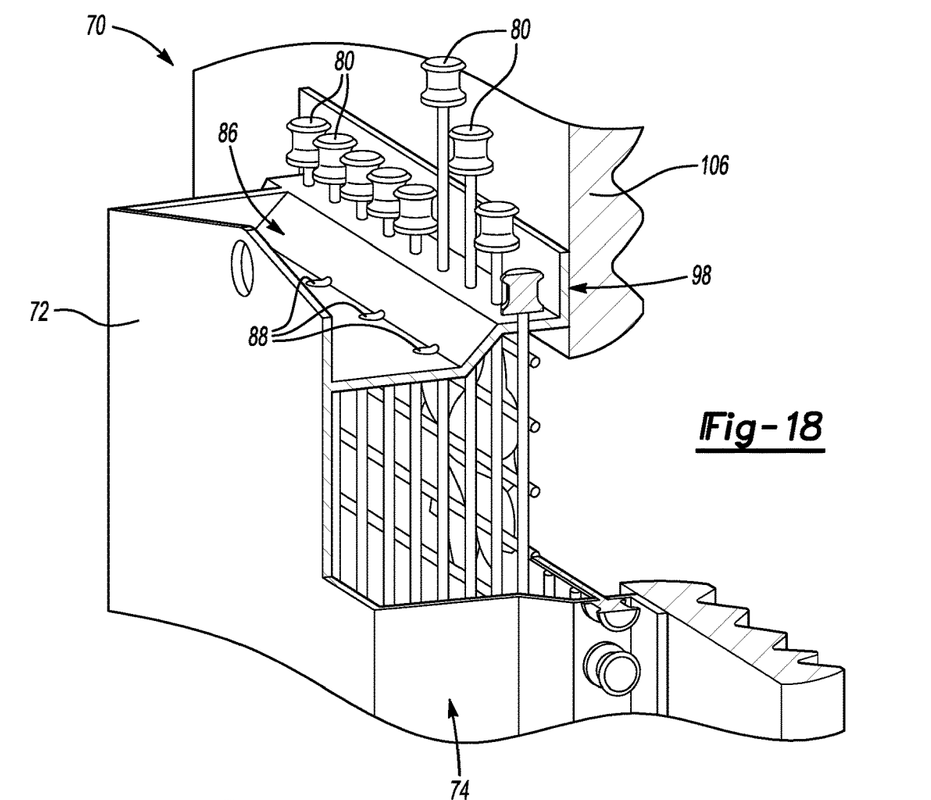
FIG. 18 is a partial sectional view from a back side of the example vertical planter box assembly.
Figure 19:
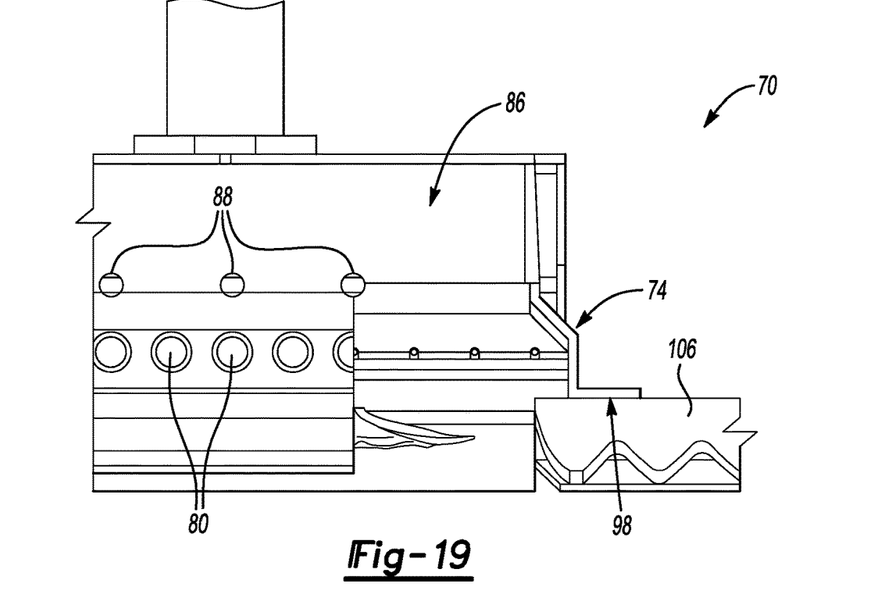
FIG. 19 is a partial sectional view from a top of the example vertical planter box assembly.

Referring to FIG. 15, another example vertical planter box assembly is indicated at 70 and is formed as single unitary box 72 with side portions 74, top portion 76 and bottom portion 78. The box 72 is integrally formed from a plastic material and is provided as a substantially one piece part. The top portion 76 includes a basin 86 for receiving water and spreading the water into plants 12 supported within the cavity 84. A drip tray 82 is supported from the bottom portion 78 to catch water as it drains through the cavity 84. A plurality of pins 80 are inserted through openings in the top portion 76 and the side portions 74 to form the support structure that holds the plants 12. An outer flange 98 surrounds the perimeter of the cavity 84 to enable attachment of a decorative boarder or frame.

Referring to FIGS. 16, 17, 18 and 19 with continued reference to FIG. 15, the planter box assembly 70 includes a back portion 92 with a mounting opening 90 near the top. The back portion 92, side portions 74, top portion 76 and bottom portion 78 define the interior cavity 84. The interior cavity 84 is of such a depth, width and height as is desired to provide sufficient space for different orientations of plants 12. The box 72 is generally a rectangular shape with four sides. However, the box 72 may be shaped with 5, 6 or any number of sides to form different shapes within the contemplation and scope of this disclosure. Moreover, the box 72 may include curved sides or be constructed as a curvilinear shape within the contemplation of this disclosure.

The basin 86 includes watering openings 88 to communicate water into the cavity 84 to the plants. Water within the basin 86 flows into the cavity 84 and out the drain openings 94 in the bottom portion 78. The drip tray 82 is supported below the bottom portion 78 by a support rod 96. The example support rod 96 extends from one side portion 74 to another side portion 74 and is removable. The support rod 96 is removed to enable removal and emptying of the drip tray 82 separate from the box 72 such that the box 72 may remain in place.

Figure 20:
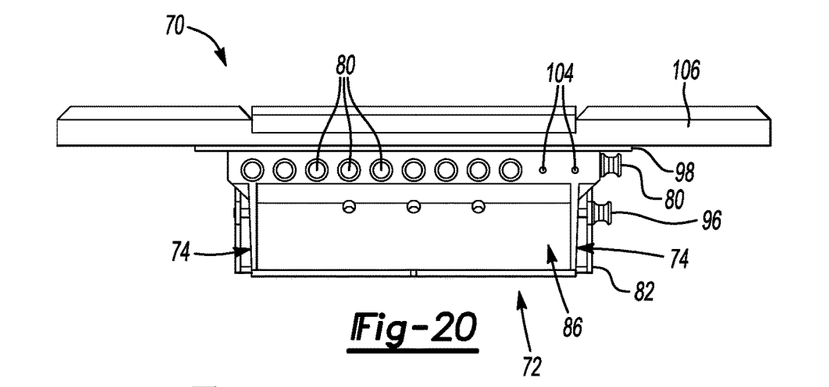
FIG. 20 is a bottom view of the example vertical planter assembly.
Figure 21:
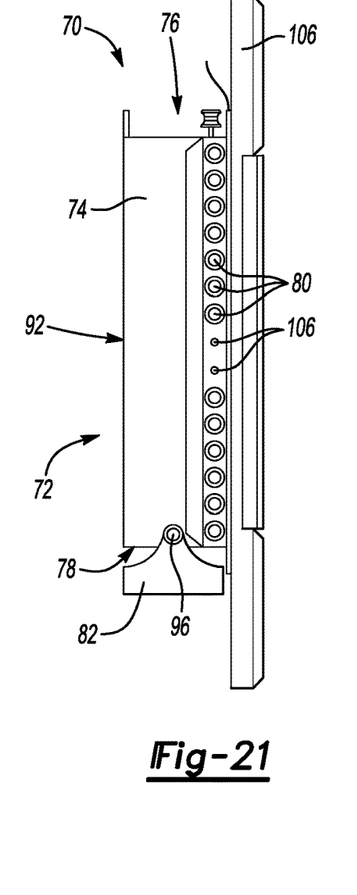
FIG. 21 is a side view of the example vertical planter box assembly.

Referring to FIGS. 20 and 21, with continued reference to FIGS. 15-19, each of the pins 80 include a head portion 100 and a shank portion 102. The shank portion 102 is inserted into openings 104 within the top portion 76 and side portions 74. The pins 80 may be made from a plastic material or metal material. The shank portion 102 extends through the cavity 84 either over the plants 12 or through existing root structures to hold the plants 12 in place. The head portion 100 holds the pins from falling through the openings 104 and enables removal of the pins 80 to remove the plants if needed. The pins 80 are received in corresponding openings in a side opposite the head portion 100 to secure the pins 80 in place. The fit through the openings 104 is a slight interference fit that prevents the pins 80 from coming loose during exposure to the environment.

The example box 72 is a one piece integrally molded part onto which the drip tray 82 is assembled. In this example, the box 72 is formed from a durable plastic material that includes material properties that allow for exposure to an outside environment. The pins 80 may be assembled through the openings 104 in an initial configuration and removed prior to assembly of the plants 12. The pins 80 may also be provided separate from the box 72 and assembled as needed. Although a substantially uniform grid structure is shown in FIG. 15, other non-uniform grid structures may be utilized depending on the size, shape and number of plants used to create the display.

Assembly of a plant display utilizing the example vertical planter box 70 includes the initial step of arranging a plurality of plant structures 12 within the interior cavity 84 of the box 72. The box 72 includes the flange 98 that surrounds the perimeter. A decorative frame may be attached to the flange utilizing mounting holes 108 provided at locations around the perimeter. Once the plants 12 are arranged within the cavity 84 as desired, pins 80 are inserted through openings 104 to extend across the cavity 84 to the opposing side. A pin 80 inserted through top portion 76 extends across the cavity 84 to the opposing side. The pin 80 may then be received within another opening, groove, or channel. An end of the pin 80 may also simply be held by another pin extending from one of the sides 74. In the disclosed example embodiment, the pins 80 may be received in slots 108, 110 (FIG. 1) disposed on an opposing side portion 74 or the bottom portion 78.

The shank portions 102 of each of the pins 80 may extend through root structures of the plants 12 or over the plants as appropriate depending on the size and shape of each plant 12. Once a sufficient number of pins 80 are assembled to support the plants, the planter box assembly 70 may be immediately hung without waiting for the plants to form a root system. Water maybe immediately added to the basin 86 to encourage further growth and health of the plants 12.

Figure 22:
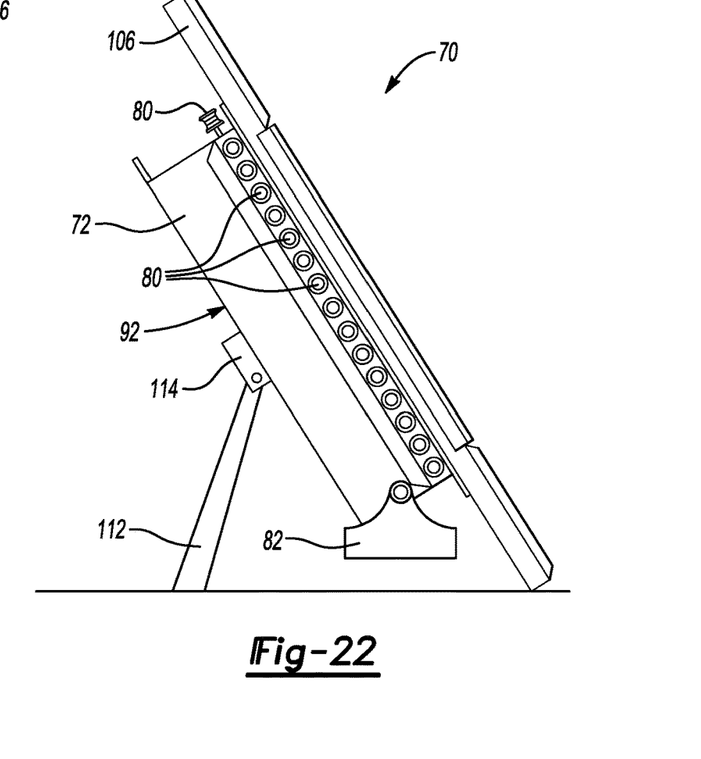
FIG. 22 is side view of the example vertical planter box assembly with stand for display on a flat surface.

Referring to FIG. 22, a stand 112 is pivotally attached to a mount 114 to enable display on a flat surface such as a shelf or table top. The mount 114 is attached to the back 92 of the planter box 72 and is movable to also enable mounting to a wall. The stand 112 supports the planter box 72 at an angle on the flat surface to provide another display option. As appreciated, the example stand 112 may be an integral or attached feature of the planter box assembly 70.

It should be appreciated that although the above assembly method is described in view of the planter box embodiment shown in FIG. 15, each of the previously described planter box embodiments disclosed herein would also be used in a similar manner with minor accommodation for the differing support structure embodiments.

Accordingly, the example vertical planter box includes a support structure tailored to the desired plant grouping and orientation and enables the use of mature plants. Moreover, the disclosed planter boxes enable watering in a vertical orientation by capturing excess water within a drip tray. The disclosed vertical planter box and support systems therefore enables assembly, and creation of many different combinations and groupings of plants that can be constructed and ready for hanging substantially immediately upon completion.

Although an example embodiment has been disclosed, a worker of ordinary skill in this art would recognize this is not just a material specification and that certain modifications would come within the scope of this disclosure. For that reason, the following claims should be studied to determine the scope and content of this disclosure.

What is claimed is:
1. A vertical planter box assembly comprising:
   a top, a bottom; and sides defining an interior cavity for receiving plants, wherein the top and bottom surfaces are parallel to each other and an opening to the interior cavity is transverse to the top and bottom surfaces;

a water basin disposed at the top including watering holes open to the interior cavity;

a drip tray pivotally supported by a support rod below the bottom, the bottom including drainage openings and the drip tray catches moisture draining through the drainage openings; and a plurality of pins extending across the interior cavity and are received within a corresponding plurality of openings in the top and the sides across the interior cavity for supporting plants installed within the interior cavity once plants are installed; wherein a first group of the plurality of pins extends through openings in the top across the interior cavity and a second group of the plurality of pins extends through openings in one side and across the interior cavity.

2. The vertical planter box assembly as recited in claim 1, wherein the water basin is defined within walls disposed about a perimeter of the water basin.

3. The vertical planter box assembly as recited in claim 1, wherein each of the plurality of pins include a head on one side and a pin portion that extends across the interior cavity.

4. The vertical planter box assembly as recited in claim 1, including a front flange extending outward about a perimeter of the interior cavity for attachment of a decorative border.

5. The vertical planter box assembly as recited in claim 4, including a back surface opposite the front flange.

6. The vertical planter box assembly as recited in claim 1, wherein the top, bottom and sides are formed from plastic.

7. The vertical planter box assembly as recited in claim 1, wherein the top, bottom and sides comprise an integral one piece part.

8. The vertical planter box assembly as recited in claim 1, wherein the top, bottom and sides comprise multiple attached parts.

9. A vertical planter box assembly comprising:

a perimeter wall portion disposed around an interior space, the perimeter wall portion including a plurality of openings aligned about the interior space, the perimeter wall portion including a top wall portion, a bottom wall portion, and side wall portions, the top wall portion is parallel to the bottom wall surface and the interior space is open to a front side transverse to both the top wall portion and the bottom wall portion;

a water basin portion disposed as part of the top wall portion, the water basin including openings for communicating water into the interior space;

a drip tray supported below the bottom wall portion of the perimeter wall portion, the bottom wall portion including a plurality of openings for draining water from the interior space into the drip tray;

a plurality of pins; received within a corresponding plurality of openings in the top wall portion and side wall portions across the interior space; wherein a first group of the plurality of pins extends through openings in the top wall portion across the interior space and a second group of the plurality of pins extends through opening in one of said side wall portions and across the interior space to hold plant structures within the interior space.

10. The vertical planter box assembly as recited in claim 9, including a perimeter flange extending outward for attachment of a decorative border.

* * * * *

UNITED STATES PATENT AND TRADEMARK OFFICE
CERTIFICATE OF CORRECTION

PATENT NO. : 10,980,188 B2
APPLICATION NO. : 16/052950
DATED : April 20, 2021
INVENTOR(S) : William Stuart Duncan It is certified that error appears in the above-identified patent and that said Letters Patent is hereby corrected as shown below:

In the Claims

In Claim 1, Column 6, Line 65; replace "top and bottom surfaces" with --top and bottom--

In Claim 1, Column 6, Line 67; replace "top and bottom surfaces;" with --top and bottom;--

In Claim 9, Column 8, Line 10; replace "bottom wall surface and" with --bottom wall portion and--

Signed and Sealed this
Twenty-sixth Day of April, 2022

Katherine Kelly Vidal
*Director of the United States Patent and Trademark Office*